United States Patent [19]

Truman et al.

[11] Patent Number: 4,651,070
[45] Date of Patent: Mar. 17, 1987

[54] TRANSIT VEHICLE START-UP PROPULSION MOTOR CONTROL APPARATUS AND METHOD

[75] Inventors: William M. Truman, Baldwin Boro; Henry J. Wesling, Mt. Oliver, both of Pa.

[73] Assignee: Westinghouse Electric Corp., Pittsburgh, Pa.

[21] Appl. No.: 761,453

[22] Filed: Aug. 1, 1985

[51] Int. Cl.$^4$ .............................................. H02P 5/06
[52] U.S. Cl. ................................. 318/318; 318/317; 318/139; 318/341; 318/345 E; 363/124
[58] Field of Search ............... 318/139, 257, 309, 310, 318/311, 312, 313, 314, 315, 316, 317, 318, 326, 327, 328, 332, 341, 345, 599, 600, 601, 602, 603, 604, 605, 606, 607, 608, 609, 615, 616, 617, 618, 274, 811; 363/124

[56] References Cited

U.S. PATENT DOCUMENTS

| Re. 27,472 | 9/1972 | Thorne-Booth | 246/34 CT |
|---|---|---|---|
| 3,532,877 | 10/1970 | Thorne-Booth | 246/34 |
| 3,630,304 | 12/1971 | Sahinkaya | 318/327 X |
| 3,747,000 | 7/1973 | McIver | 328/75 |
| 4,090,116 | 5/1978 | Lippitt | 318/327 X |
| 4,095,153 | 6/1978 | Matty et al. | 318/376 |
| 4,282,466 | 8/1981 | Matty | 318/434 |
| 4,339,697 | 7/1982 | Franz | 318/341 |
| 4,367,520 | 1/1983 | Muto et al. | 318/811 X |
| 4,377,779 | 3/1983 | Plunkett | 318/811 |
| 4,381,479 | 4/1983 | Wesling et al. | 318/317 |
| 4,408,268 | 10/1983 | Peters et al. | 318/811 X |
| 4,409,534 | 10/1983 | Bose | 318/345 E X |
| 4,477,762 | 10/1984 | Kurakake et al. | 318/811 X |
| 4,481,457 | 11/1984 | Zach et al. | 318/811 X |
| 4,514,665 | 4/1985 | Melocik et al. | 318/345 E X |

Primary Examiner—William M. Shoop, Jr.
Assistant Examiner—Shik Luen Paul Ip
Attorney, Agent, or Firm—R. S. Lombard

[57] ABSTRACT

Current regulation is provided for the propulsion motor of a vehicle operative with a track signal block control signal having a known frequency characteristic, by modulation of a selected group of potential output ON pulses from a chopper apparatus coupled with the motor and in relation to the program cycle time of a control microprocessor such that the resulting harmonic sidebands are positioned to minimize electromagnetic interference with that control signal.

2 Claims, 13 Drawing Figures

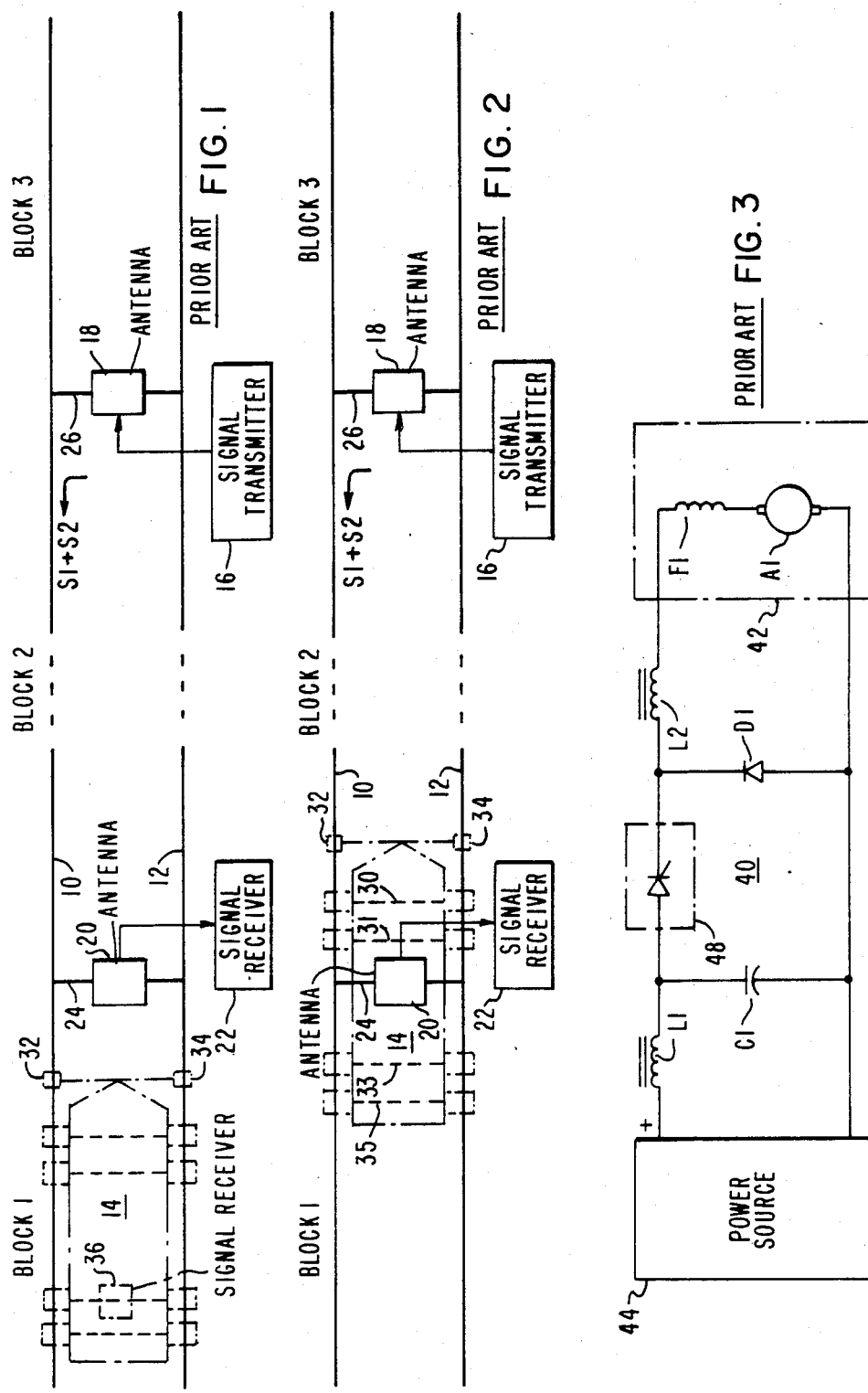

TRANSIT VEHICLE START-UP PROPULSION MOTOR CONTROL APPARATUS AND METHOD

BACKGROUND OF THE INVENTION

The present invention relates to reducing the harmonic noise generated by the propulsion motor control chopper apparatus of one or more transit vehicles in relation to receiving the input control signal frequencies, such as are provided for a vehicle detection and for speed control within predetermined track signal blocks, as described in an article published in the Westinghouse Engineer for September, 1972 at pages 145 to 151.

Both the train vehicle traction power system and the train vehicle control and protection system use the running rails as electrical conductors. The ground return current path for heavy rail and light rail transit vehicle systems is one or both of the running rails. The rails are also divided into regions called signal blocks by the train control and protection system for the provision of circulating signal currents in the running rails. These signal currents are used to detect the presence of the train vehicle in a block section of track and in some systems to provide the train vehicle with the safe speed to proceed information. The signals in the running rails are used to avoid rear end collisions, head-on collisions, excessive speed in turns and to allow safe passage through switches. If the traction power system produces electromagnetic interference or EMI that conflicts with the train control and protection system signals, then vehicle safety and reliability problems can occur. It is desired to provide a control technique for a vehicle carried DC motor controlled chopper apparatus that greatly increases the signal level margin between the undesired EMI signal level produced by the chopper and the signal response threshold of the train control and protection system.

It is known in the prior art, as disclosed by U.S. Pat. No. 4,282,466 to provide a programmed microprocessor control apparatus coupled with a chopper apparatus for controlling a vehicle propulsion motor to determine the operation of that motor, and the disclosure of this patent is incorporated herein by reference.

SUMMARY OF THE INVENTION

A motor current regulating chopper apparatus operative with a DC propulsion motor is controlled during start-up by square wave modulation of the chopper output ON pulse string to group the extra harmonics during start-up to the frequency domain area immediately surrounding the harmonics for producing a spectrum of sidebands around each chopper harmonic such that the magnitude of the sidebands drop off as a function of 1/n where n is the sideband number.

The squarewave modulation allows low voltage application to series DC motors for jerk limited starts and confines the EMI produced by the chopper to frequency regions that will minimize interference with track signalling systems.

BRIEF DESCRIPTION OF THE DRAWINGS

FIG. 1 shows a prior art track signalling system including a signal block not occupied by a vehicle;

FIG. 2 shows the prior art signalling system of FIG. 1 with a vehicle occupying the previously unoccupied signal block;

FIG. 3 shows a prior art single quadrant chopper apparatus coupled to control a vehicle propulsion motor;

DESCRIPTION OF THE PREFERRED EMBODIMENT

Figure 4:
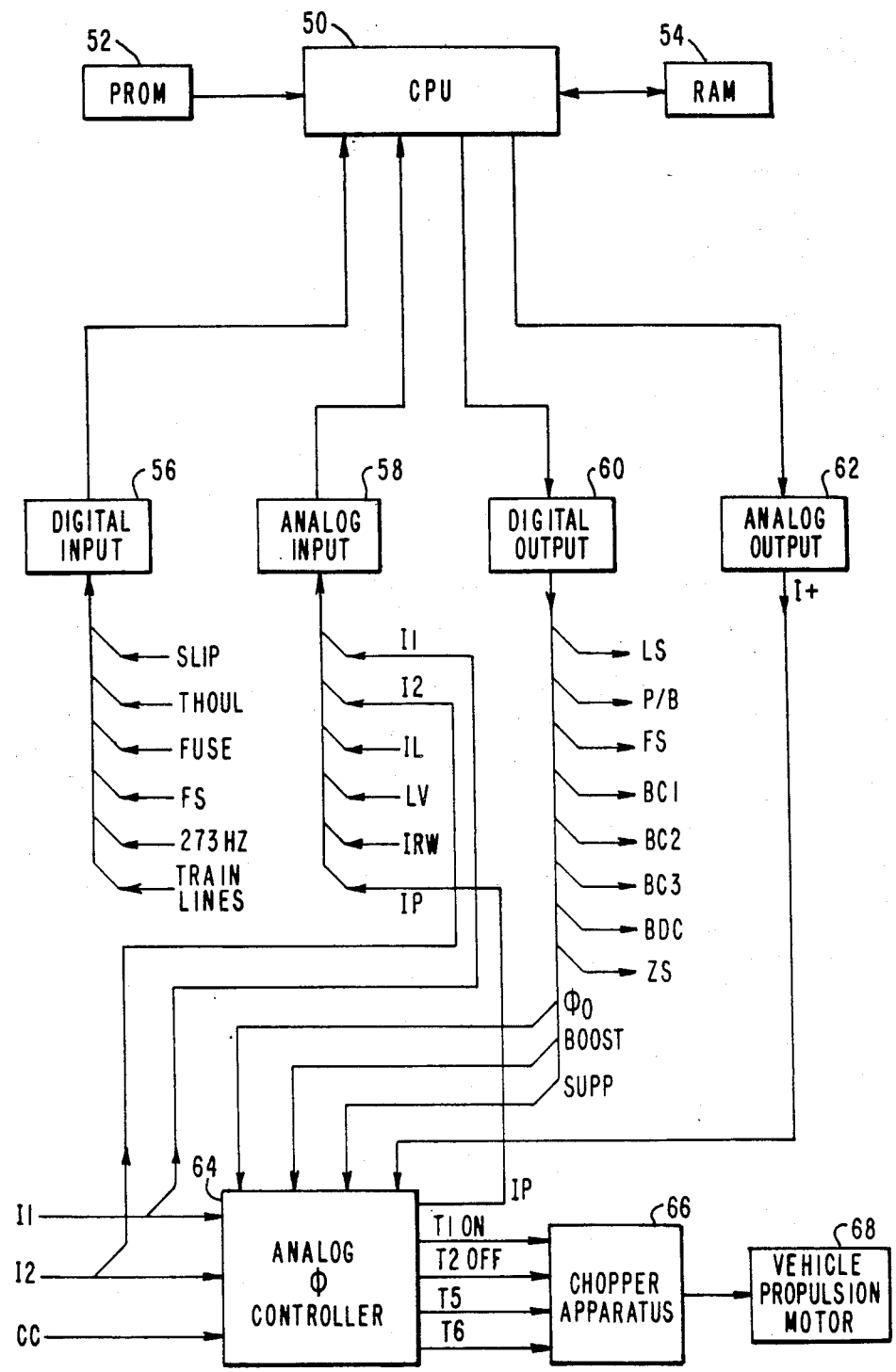
FIG. 4 shows schematically a prior art microprocessor controlled chopper apparatus connected to determine the operation of a vehicle propulsion motor.

In FIG. 1, there is shown a prior art transit vehicle signalling system, including two track rails 10 and 12, which may be substantially continuous and comprise a plurality of welded sections with no insulating joints therebetween. A transit vehicle 14 is provided to move along the track. A signal transmitter 16 operating at a frequency S1 is connected to energize an antenna 18 such that there is induced within the rails 10 and 12 a signal at frequency S1. The train vehicle 14 is shown in a position to the left of the antenna 20 operative with a signal receiver 22 adapted to receive the track signal at frequency S1. The signal receiver 22 is operative to receive this signal S1 at a high magnitude when the train vehicle 14 is not positioned between the location of the transmitting antenna 18 and the receiving antenna 20. The receiving antenna 20 is coupled to a short circuiting bar or conductor 24 which is electrically connected between the rails 10 and 12 at the location of the receiving antenna 20. A similar short circuit bar or conductor 26 is electrically connected between the rails 10 and 12 at the location of the antenna 18. The antenna 18 is cooperative with the conductor 26 to result in the local signal being introduced into the rails 10 and 12. The receiving antenna 20 is operative to sense the track signal and frequency S1 which is flowing in the short circuit conductor 24 connected between the rails 10 and 12.

As shown in FIGS. 1 and 2, from the antenna 18 the signals S1 and S2 are coupled into the rails 10 and 12. S1 will be considered the occupancy signal and S2 will be considered the cab signalling signal providing a speed command to the vehicle 14. The signalling receiving antenna 20 is coupled with the receiver 22 tuned to the S1 frequency. The presence of signal S1 at the receiver 22 of the block 2 is interpreted as meaning that there is no train vehicle in the block 2. If an axle of a train vehicle is in the block 2, then the signal S1 will be shorted or shunted and will not reach the receiver 22 at the left end of the block 2. The absence of signal S1 at the receiver 22 is interpreted as meaning that there is an occupancy by a train vehicle 14 in the block 2.

In FIG. 2, there is shown the operation of the prior art signalling system shown in FIG. 1 with a train vehicle 14 positioned over the conductor bar 24 such that the two front axles 30 and 31 are positioned within the block 2 and the rear two axles 33 and 35 are positioned within the previous block 1. The vehicle axles 30 and 31 along with associated wheels operate to short circuit the occupancy determining signal at frequency S1 within the signal block 2.

Inductively coupled antennas 32 and 34 on the first car 14 of a train receive signal S2 and interpret it to determine a maximum speed that the train vehicle 14 can proceed in block 2 when the lead train vehicle is in block 2 as shown in FIG. 2. The position of other trains in the system ahead of the vehicle 14 is used to determine the maximum speed that the train vehicle 14 can proceed in block 2. If there is a train immediately ahead of the train vehicle 14 or a track switch that is at the wrong direction, then the maximum allowable speed in block 2 would be 0 mph. The signal S1 could be a single unmodulated frequency, a single square wave modulated frequency or a frequency pair. Signal S2 could be a single square wave modulated frequency or a frequency pair. In any case, the train control and protection signals S1 and S2 occupy distinct and fixed regions in the frequency domain. The receiver 22 also has defined sensitivities at the signalling frequencies and input filters to reject unwanted signal frequencies.

FIG. 3 shows a prior art single quadrant chopper apparatus 40 coupled with a DC series motor 42, such as disclosed in U.S. Pat. No. 4,257,092 of F. J. Prines et al. A positive DC voltage is received from a power source 44. The inductor L1 and capacitor C1 comprise an input filter 46. The switch 48 includes one or more thyristors to conduct current in the direction indicated and one or more thyristors, reactors and capacitors comprising a commutation circuit. The diode D1 includes one or more diodes that are used to carry free wheeling current. The DC series motor 42 includes the field F1 and armature A1. L2 is a motor reactor that is provided to smooth the motor current. When the switch 48 of chopper 40 conducts current, the voltage across capacitor C1 is impressed across the forward diode D1 and the motor circuit in parallel, with the motor circuit including the motor reactor L2. When the switch 48 is not conducting, current circulates in the motor circuit including the motor reactor dL2, motor 42 and the diode D1. The chopper 40 normally turns the switch 48 ON at the beginning of a control cycle and OFF with varying delay to vary the average voltage applied to the motor circuit. The control cycle is fixed for a particular application and the duty cycle of the switch 48 conducting pulses controls the average voltage. Typical chopper control cycle frequencies range between 200 and 300 Hz. The chopper 40 produces both induced and conducted EMI signals that have the potential to interfere with a vehicle control signalling system. When the switch 48 conducts, it draws current from capacitor C1 and inductor L1 which reduces the voltage across C1. When the switch is not conducting during a control cycle, the current through inductor L1 recharges the capacitor C1. The difference between the voltage across capacitor C1 and the power source 44 is impressed across the inductor L1, and this ripple voltage creates a ripple current in the propulsion current flowing to and from the train vehicle in relation to the power source 44. The frequency content of this ripple current is at multiples of the chopper control cycle frequency, which current flows through the track rails 10 and 12 and returns to the power source 44. Since the signalling system also uses the track rails, their exists the potential for interference with the ripple current as conducted EMI.

A second source of EMI signals is produced primarily by the commutating circuit within the switch 48, which turns OFF the forward conducting thyristors in the switch 48 and also by the motor reactor L2. The commutation process involves high di/dt that produces strong magnetic fields under the vehicle. The motor reactor L2 magnetically magnifies the motor ripple current to produce strong magnetic fields under the vehicle. These magnetic fields induce a voltage into the track rails 10 and 12 under the vehicle and also directly into the track circuit receiver 22 when the receiver 22 location is between the two inner axles 31 and 33 of the vehicle 14 as shown in FIG. 2. This induced voltage also has the potential for interference and is referred to as induced electromagnetic interference or induced EMI. If the signalling block 2 is unoccupied and the conducted EMI signals, which is the type of EMI signals provided for an unoccupied block, interferes with the normal occupancy signal reception, then the block 2 might be declared occupied when actually there would be no train vehicle present. This creates an operational problem that unnecesarily slows down or stops vehicle trains. If the track circuit receiver 22 could interpret the chopper produced EMI signals as being a valid signal, then an occupied block 2 as shown in FIG. 2 could be declared as unoccupied to create a safety problem. This could be caused by either conducted EMI signals or induced EMI signals. Conducted EMI signals could also interfere with the signalling signal S2 in FIG. 2 by preventing the proper signal from being decoded by the vehicle carried receiver 36 shown in FIG. 1. To achieve compatibility between the signalling system and the propulsion control system, an effort is made to choose the control cycle frequency of the switch 48 and the signalling frequencies, such as S1 and S2, so that no harmonic of the control signal frequency of the switch 48 falls on or near a signalling frequency S1 and S2. The signalling frequencies should also not fall on harmonics produced by the traction power rectification. When this is accomplished and the EMI signal levels are controlled by proper design of the chopper input filter L1 and C1, commutation circuit and magnetic components, then the available compatibility is achieved. An effort is made to design the input filters of the signalling system receivers to reject the chopper harmonic EMI signals, with the chopper harmonics outside of the pass bands of the signalling receivers.

In relation to the start-up from zero speed of the vehicle propulsion motor with a chopper propulsion control system, there is a minimum practical duty cycle time in which the switching circuit 48 is capable of being turned ON and then back OFF, primarily due to the time needed to charge the commutating circuit of the switch 48. This minimum time puts a limit on the minimum non-zero start-up voltage that can be applied to the motor circuit each control cycle. Unfortunately, this minimum voltage is more than can be applied to a non-rotating DC propulsion motor, without causing a vehicle jerk rate that is unacceptable for desired passenger comfort. In order to achieve a desired low motor voltage for start-up, several prior art techniques have been utilized, such as inserting series resistors to reduce the motor voltage which increases the cost, weight and size of the chopper and decreases the reliability. Another prior art technique is to sweep the frequency of the chopper beginning with the low control cycle frequency and increase it as the motor picks up rpm until the voltage produced by the chopper with minimum duty cycle of switch 48 and normal chopper frequency can be used by the motor. A third technique is to monitor the motor current and skip the turning ON of the switch 48 whenever the motor current is higher than the requested motor current, which is called pulse skipping. Both sweep frequency start-up operation and pulse skipping for reduced voltage on start-up have an EMI drawback problem, since they can produce harmonic content at frequencies that are close to or overlap the selected signalling frequencies. Although these levels are somewhat reduced as compared to the levels of the normal harmonics, they are difficult to filter out by the signalling system. It then becomes necessary to reduce the EMI signal levels to the point that the signals will not satisfy the determined input signal threshold levels of the signalling receivers without the help of receiver filter rejection, which is often very difficult and costly to achieve.

In FIG. 4, there is shown a functional illustration of a chopper control apparatus, such as set forth in U.S. Pat. No. 4,282,466, and including a CPU microprocessor 50 operative with a prom programmable memory 52 and a scratch pad RAM random access memory 54 used for intermediate storage. The application program is stored in the programmable memory 52. There are four illustrated categories of input and output signals relative to the controlled process operation of a transit vehicle. The digital input signals are supplied through the digital input 56 from the transit vehicle and include the slip slide signal Slip, the thyristor temperature sensor thermal overload signal Thoul, the effective value of the line filter capacitor as indicated by the fuse counter signal Fuse, the field shunt feedback signal FS, the 273 hertz clock signal and the trainlines signals. The analog input signals are supplied through analog input 58, and include the first propulsion motor current I1, the second propulsion motor current I2, the line current IL, the line voltage LV, the air pressure in the vehicle support bag members provided load weighted current request signal IRW and the analog phase signal IP. The digital output signals are supplied through digital output 60 to the control transit vehicle, and include the line switch control signal LS, the power brake mode control signal P/B, the field shunt control signal FS, the first braking resistor control signal BC1, the second braking resistor control signal BC2, the third braking resistor control signal BC3, the zero ohm field shunt control signal BDC, the zero speed signal ZS, the phase zero control signal $\phi_0$, the rate timing signal Boost and the ON suppress control signal SUPP. The analog output current request signal I+ is supplied through analog output 62 going to an analog phase controller 64 operative to supply the T1 control signal ON to fire the chopper thyristor, the T2 control signal OFF to fire the commutating chopper thyristor, the T5 control signal OFF for the brake chopper and the T6 control signal ON for the brake chopper. The time period associated with turning the chopper ON and OFF is at a constant frequency of 273 Hz that defines the clock time interval for the program cycle and for checking the process operation. During each of the 273 time intervals per second, the program cycle operates through the application program.

The chopper normally controls the motor voltage by a change of duty cycle, and at normal motor speed it fires ON every cycle and an OFF every cycle, until duty cycle reaches 100%, at a predetermined frequency such as a 273 Hz. For start-up of the motor there is a minimum duty cycle that can be applied to a transit vehicle propulsion motor, and if that minimum duty cycle of about 6.8% is applied to start up a motor that is not turning, this will result in too large of a voltage for the motor and the vehicle will jump ahead in a manner not desired for passenger comfort. The prior art control operation in response to a current request was to fire the chopper ON and OFF and the microprocessor would look at the motor current and compare it with the current request. If the motor current was greater than the current request, the chopper T1 is not fired ON and instead skips one or more firing pulses until the motor current feedback is less than the current request as indicated by the trainlines. As the motor picks up speed and the counter EMF voltage builds up, more voltage can be applied to the motor by the chopper.

Figure 5:
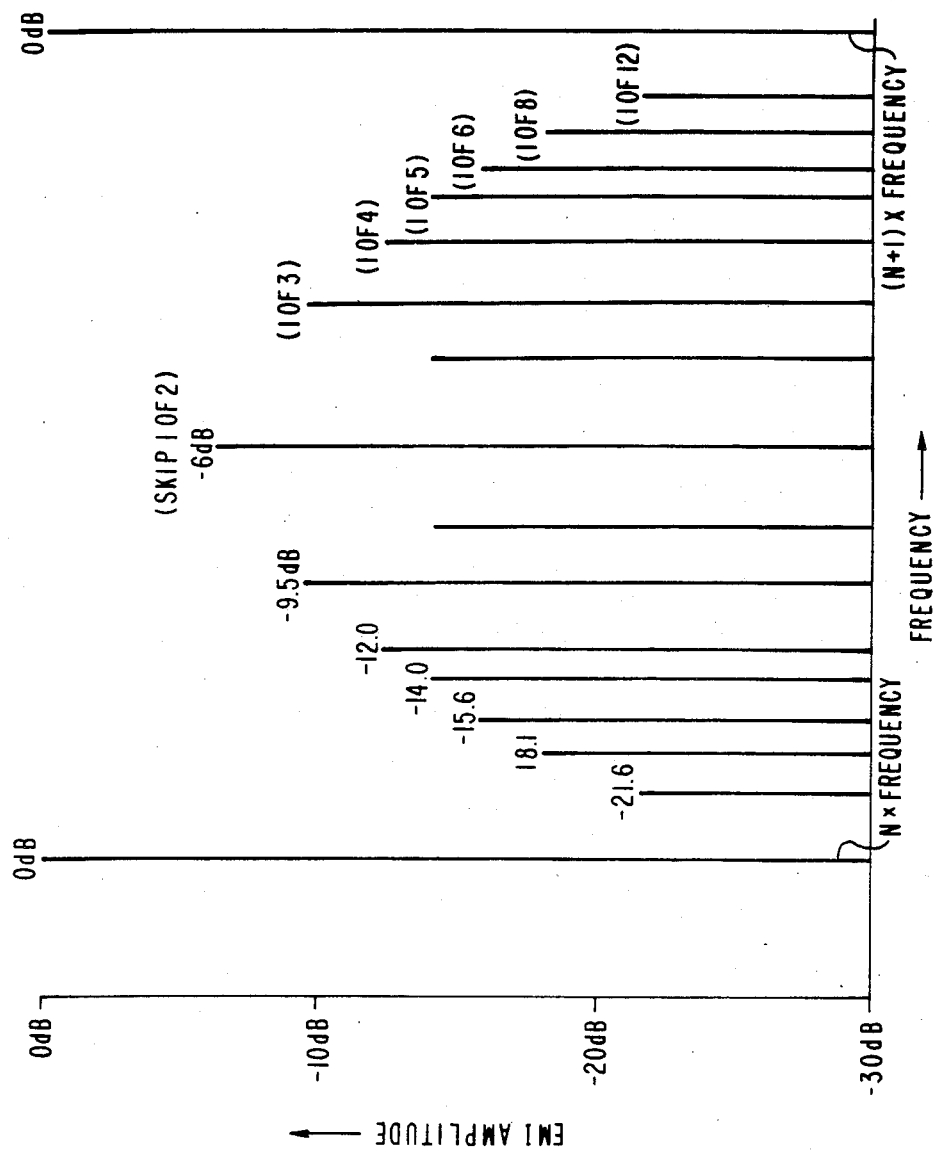
FIG. 5 shows the relative levels of electromagnetic interference or EMI signals produced by the prior art chopper apparatus when operated with uniform pulse skipping to reduce the motor voltage for start-up from zero speed.

FIG. 5 shows the levels of EMI signals produced by a prior art pulse skipping operation as compared with the normal harmonics that occur at multiples of the normal chopper control frequency. If every other pulse or one out of two pulses is skipped, harmonics are produced at half the normal chopper control frequency, and the voltage amplitude is reduced to one-half or $-6$ dB, but the harmonics can be in the pass band of the signalling receiver. The receiver filters typically have at least 40 dB rejection of the normal harmonics so the interface situation is worsened by 34 dB or 50 to 1 during the pulse skipping period. The voltage amplitude reductions for skipping one pulse out of three pulses and so forth up to one pulse out of twelve pulses is shown.

Figure 6:
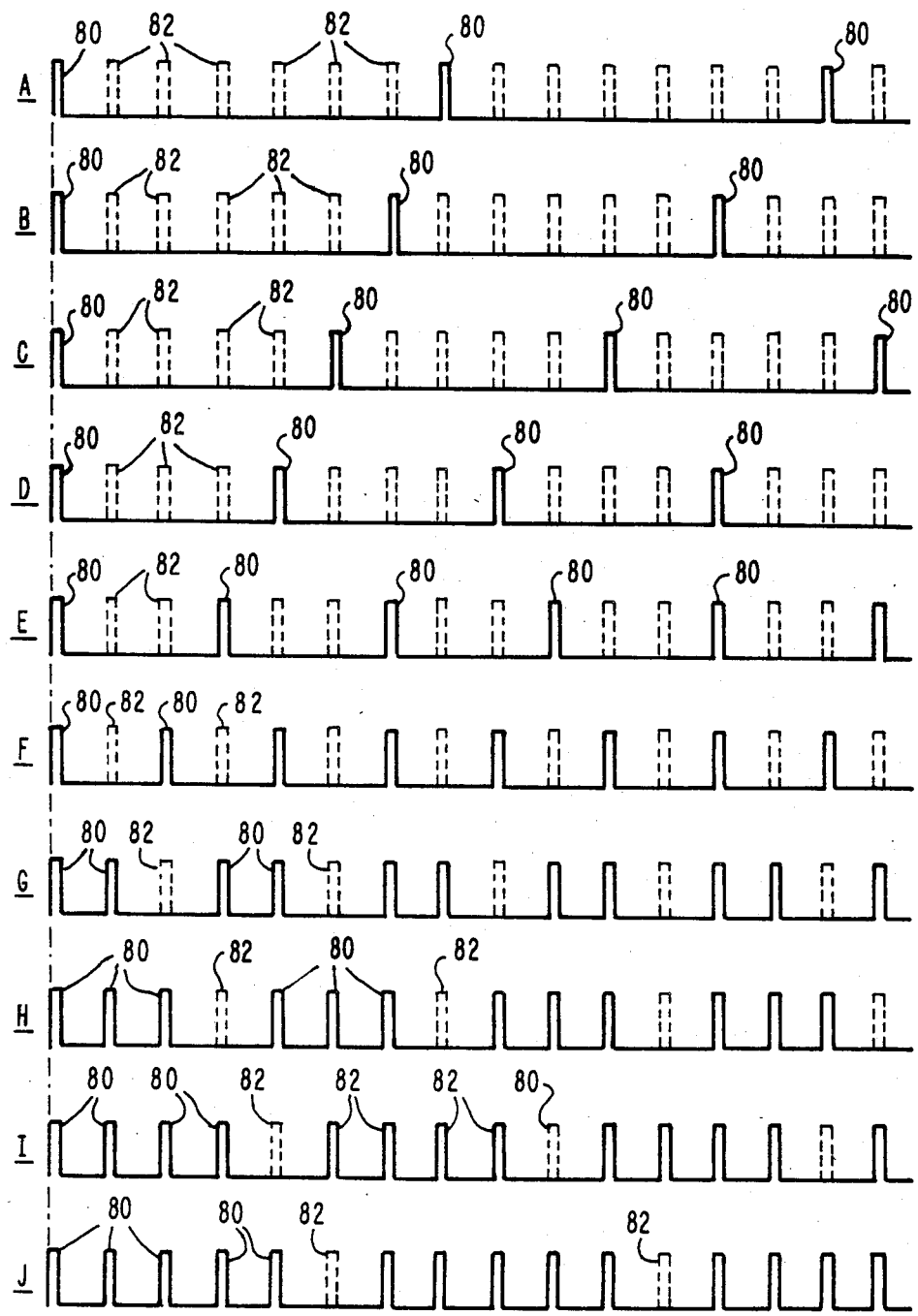
FIG. 6 illustrates the prior art operation of the chopper apparatus with uniform pulse skipping.

FIG. 6 illustrates the prior art uniform pulse skipping operation of the chopper apparatus. The motor voltage buildup utilizing uniform skipping of output ON pulses by the chopper apparatus is provided by suppressing output ON pulses. For start-up of the propulsion motor, the analog phase controller 64 receives a jerk rate limited motor current request I+ from the microprocessor 50. A T1 ON pulse is then fired followed by a T2 OFF pulse that can result in the minimum ON time for one 273 Hz chopper control cycle of approximately 250 microseconds or a 6.8% duty cycle. For each subsequent cycle two control functions are performed. If the motor current at the beginning of a 273 Hz chopper control cycle is in excess of the current request and the duty cycle of the chopper is already minimum, then a T1 ON pulse would not be fired and the chopper would skip turning on that control cycle. If the motor current falls below the requested amount, the duty cycle of the chopper is increased by further delaying the firing of T2 OFF pulses with respect to T1 ON pulses. When the chopper duty cycle is not minimum, the duty cycle control is used whether the measured motor current is above or below the current request. Pulse skipping was used in the prior art to reduce the motor voltage when the duty cycle was at a minimum duty cycle and could not further reduce the voltage.

If 1/7 of a minimum duty cycle voltage is desired, the prior art pulse skipping as shown in FIG. 6A would fire one ON pulse 80 followed by six suppressed ON pulses 82. For the prior art pulse skipping to obtain ½ of the minimum duty cycle voltage, the control provided as shown in FIG. 6F would provide one ON pulse 80 and then would suppress the next ON pulse 82 and this operation would repeat, which resulted in the prior art pulse skipping operation changing the frequency of the chopper. If it was desired to be ON every third pulse, the prior art practice shown by curve 6E was the same as reducing the chopper frequency by 3, and an ON pulse 80 is provided followed by two suppressed ON pulses 82, that is 3 divided by 273 seconds and this gives harmonics at the new chopper frequency which is ⅓ of the previous frequency. The FIG. 6A shows one ON pulse 80 followed by six suppressed ON pulses 82. The FIG. 6B shows one ON pulse 80 followed by five suppressed ON pulses 82. FIG. 6C shows one ON pulse 80 followed by four suppressed ON pulses 82. FIG. 6D shows one ON pulse 80 followed by three suppressed ON pulses 82. FIG. 6E shows one ON pulse 80 followed by two suppressed ON pulses 82., FIG. 6F shows one ON pulse 80 followed by one suppressed ON pulse 82. FIG. 6G shows two ON pulses 80 followed by one suppressed ON pulse 82. FIG. 6H shows three ON pulses followed by one suppressed ON pulse 82. FIG. 6I shows four ON pulses 80 followed by one suppressed ON pulse 82. FIG. 6J shows five ON pulses 80 followed by one suppressed ON pulse 82. This chopper operation is provided until the motor speed reaches a value, such as 5 mph, at which the ON pulses are no longer suppressed and voltage control is provided by duty cycle variation.

Figure 7:
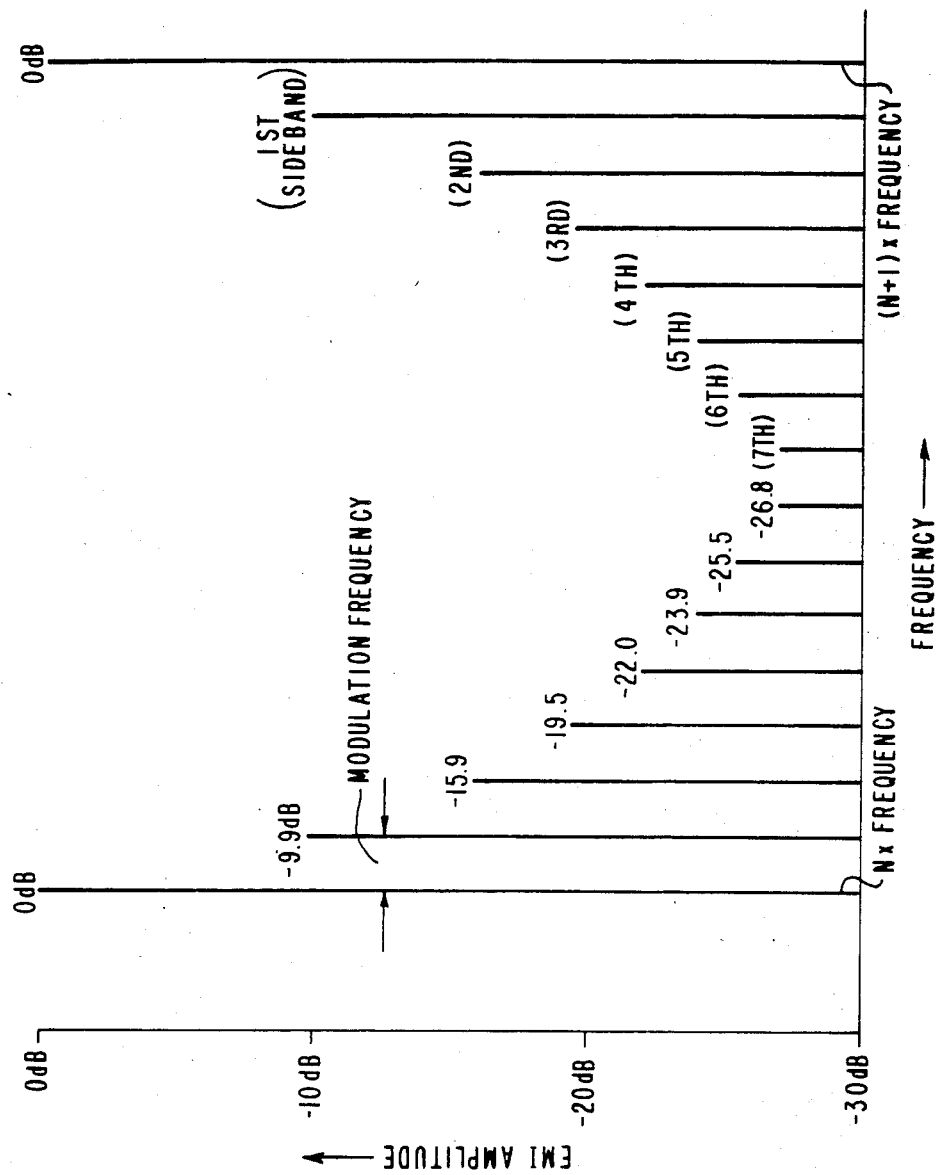
FIG. 7 shows the relative levels of EMI signals produced by the improved motor start-up pulse modulation operation of the present invention.

In FIG. 7, there is shown the spectral frequency relationship of normal harmonics using the low frequency square wave modulation of the chopper output ON pulse stream in accordance with the present invention.

Figure 8:
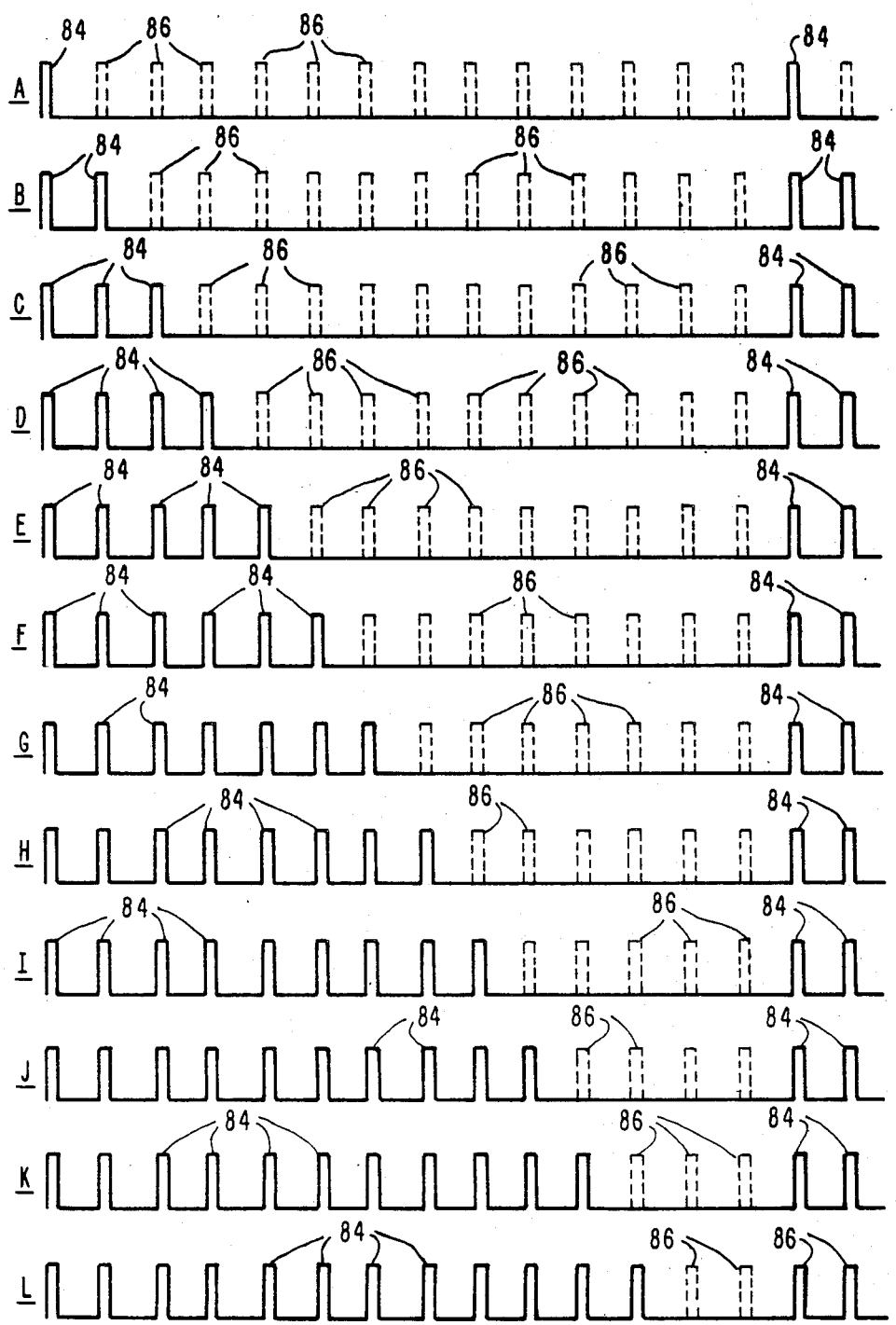
FIG. 8 illustrates the operation of the chopper apparatus with the improved motor start-up pulse modulation of the present invention.

In accordance with the present invention an effective square wave modulation of the string of T1 ON pulses is provided as shown in FIG. 8, with the chopper operating frequency remaining the same. This modulates the pulse string of minimum duty cycle pulses in relation to a predetermined time period of pulses, such as about a 19.5 hertz time period including 14 pulses. The phase controller 64 is operative and it can build up the duty cycle of the chopper apparatus 66 until another ON pulse is added to the string of pulses for providing a smoother control of the motor. If minimum duty cycle firing ON pulses 84 are provided and followed by suppressed ON pulses 86, such as one out of 14 is fired ON, as shown by FIG. 8A or two out of 14 as shown by FIG. 8B, each of these results in a certain averaged motor voltage. To increase the number of ON pulses 84 to 3 out of 14 as shown by FIG. 8C provides 50% more voltage. The smooth transition from 2 out of 14 operation to 3 out of 14 operation is provided by increasing the duty cycle of each firing pulse at the 2 out of 14 operation until the 3 out of 14 operation is reached, and the phase controller 64 determines this duty cycle. At the end of each 14 pulse string, the firing pulse control microprocessor 50 looks at the phase controller 64. If the duty cycle is greater than 5%, then another firing ON pulse is added to the pulse count reference and to the string of provided firing ON pulses 84. The duty cycle of the phase controller is sensed which in turn is responsive to the motor current, and the duty cycle of the phase controller 64 smooths out the longer ON and OFF periods created by the modulation of the pulse skipping. In the frequency domain, if a sine wave is provided at a 273 Hz frequency, and square wave modulation is applied to that sine wave, then the resulting side band harmonics are at the modulation frequency. In the present situation, this would be at multiples of approximately 20 Hz. For chopper produced EMI each normal chopper harmonic has sidebands during the modulation process. None of the side bands is greater than is shown in FIG. 7. Instead of changing the frequency of the chopper, the string of constant frequency firing ON pulses 84 is modulated in response to the phase angle which is responsive to the difference of the motor current and requested current.

When the vehicle starts up at zero speed, the operator with a master controller requests a desired acceleration. To get that rate of acceleration, a certain level of motor current is required such as 500 amperes. The speed control operation does not jump from 0 amperes at 0 speed to the required 500 amperes, but instead provides a jerk limited smooth transaction up to the required motor current. The current request I+ starts at zero as indicated by the trainlines and controls the analog phase controller 64 which controls the T1 ON signal pulses and the T2 OFF signal pulses to determine the chopper phase angle or duty cycle for obtaining the required current in a smooth transition.

Figure 9:
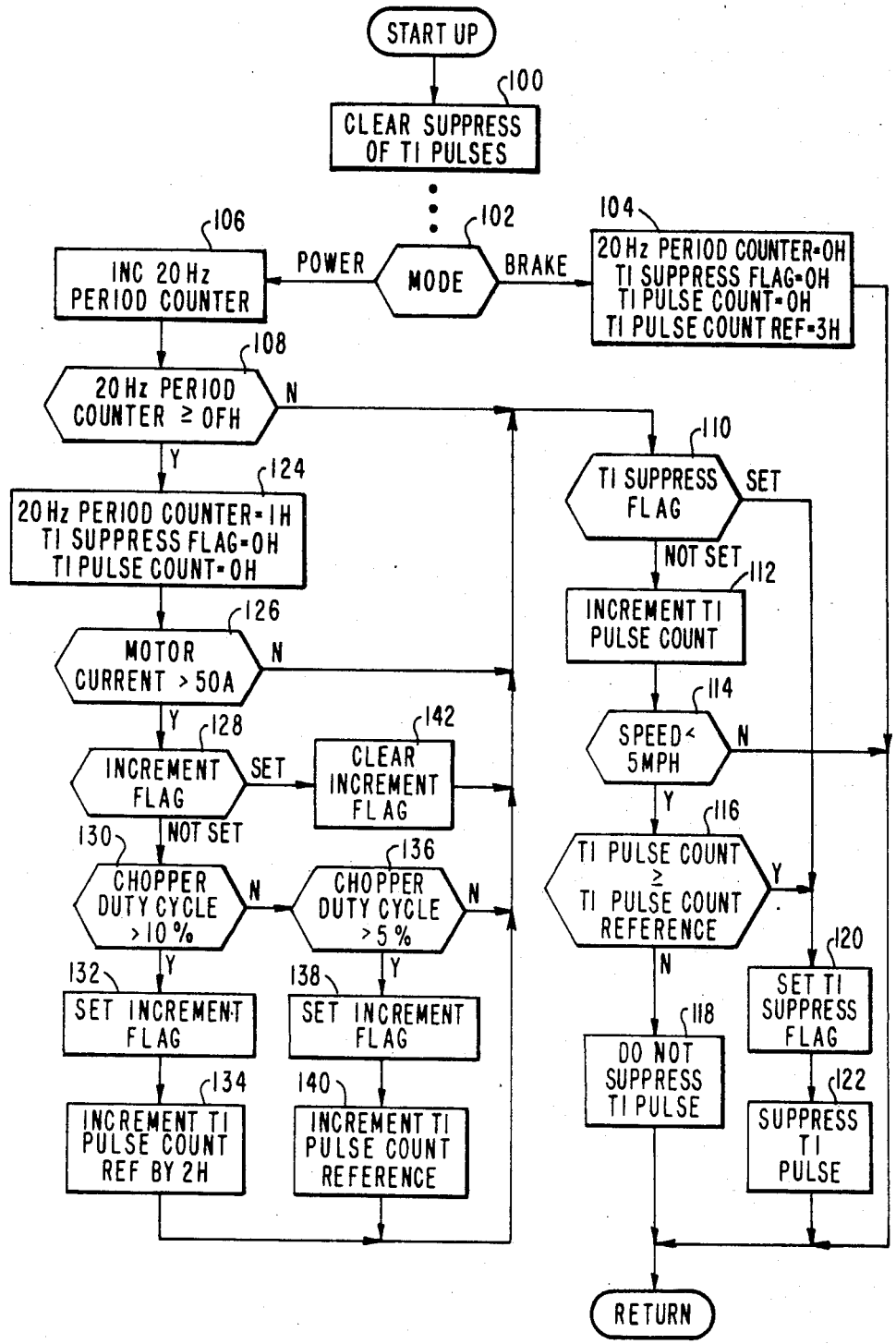
FIG. 9 shows a microprocessor program flow chart to provide the desired square wave modulation of the chopper output ON pulse string during start-up operation of a motor in accordance with the present invention.

In FIG. 9, there is shown a flow chart of a microprocessor program subroutine to control a chopper apparatus to provide a square wave modulation of the output ON pulse string used with a chopper apparatus to energize an electric propulsion motor for a vehicle. This program subroutine operates to output a T1 ON pulse during the interrupt part of the motor control program which occurs every 273 Hz. When a start-up of the motor is desired, this subroutine begins at block 100 every interrupt cycle to clear the suppression of T1 ON pulses, which is the output ON suppress control signal SUPP shown in FIG. 4 to the phase controller 64. At block 102, a check is made to determine the operational mode of the motor, since the present chopper output ON pulse modulation is provided only for motor start-up in the power mode. If the control is in the brake mode, at block 104 several flags are cleared. A predetermined period of 14 T1 ON pulses is provided by the 20 Hz period counter, and this counter is cleared, the T1 suppress flag is cleared, the TI pulse count is cleared and the T1 pulse count reference is set to three at block 104.

If the operation is in the power mode at block 102, then at block 106 the 20 Hz period counter is incremented from zero to one the first time through the program. At block 108 a check is made to see if the 20 Hz period counter is greater than or equal to 0F hex, which is equal to 15, and means that it has reached the end of the 20 Hz period, and it is time to reset the count-off. The first time through the program the 20 Hz period counter at block 108 is one and not greater than 0F hex. At block 110, a check is made to see if the T1 suppress flag is set or not set, which at this time is not set after it was cleared at block 104. At block 112, the T1 pulse counter is incremented, and since the T1 pulse counter was also set to 0 at block 104 it is now set at one. At block 114, a check is made of the speed to see if it is less than 5 miles per hour, and it will be at this time because the motor is starting at 0 speed. At block 116, a check is made to see if the T1 pulse count is greater than or equal to the T1 pulse counter reference which T1 pulse count reference establishes the total of how many T1 pulses are desired in the 20 Hz period. For example, when the T1 pulse count is one, only one T1 ON pulse in the 20 Hz period is provided and the rest of the ON pulses are not provided out of the total of 14 pulses. The next time through the routine, the T1 pulse count is incremented by one to allow two ON pulses to be provided. The T1 pulse count reference can initially be set to three. For this first time through the program, the T1 pulse count is ONE, and at block 116, this is not greater than the T1 pulse count reference of three, so a T1 ON pulse is output at block 118.

The second time this routine is called, the 20 Hz period counter at block 106 increments again so now it is at two. The 20 Hz period counter is still not greater than 15 at block 108, the T1 suppress flag is still not set at block 110, the T1 pulse count is incremented at block 112, the speed check at block 114 is still below 5 mph and the pulse count is still below the reference at block 116. So another T1 ON pulse is provided at block 118. The third time through the program increments the 20 Hz period counter to three at block 106, so out of the period of 14 this is now on the third time through. The program branches over to block 110 to check the T1 suppress flag and it is not set. Block 112 increments the T1 pulse count to be three. The speed at block 114 is less than 5 mph, and the T1 pulse count of three at block 116 is now equal to the initial reference of three, so a branch is made to block 120 to set the T1 suppress flag and at block 122 to suppress the T1 ON output pulse. This means that two T1 ON pulses in a row were provided to the chopper and now another one is not allowed. The fourth time through the program, block 106 increments the 20 Hz period counter, at block 108 this counter is not at the last 15th one, so a branch is made to block 110 to find that the T1 suppress flag is now set, because it was previously set at block 120, so the program sets it again at block 120. The T1 ON pulse is suppressed at block 122 to not allow a T1 ON pulse again. The program repeats the last operation for each cycle to not allow T1 on pulses until the program cycle for which the 20 Hz period counter is incremented to 15 at block 106. The check at block 108 now determines that the 20 Hz period counter is greater than or equal to 0F hex. Block 124 sets the 20 Hz period counter to 1 and clears the T1 suppress flag and the T1 pulse count. The T1 pulse count reference is still set to three. The program has provided 2 ON pulses out of 14, without checking to see what the chopper phase is doing or what the motor current is doing.

The fifteenth pass through this program is the start of the second 20 Hz period. Since some time has passed, it is now desired to check what else is happening with the rest of the motor control system. At block 126 a check is made of the motor current to see if it is greater than 50 amps. This is checking the buildup of motor current, which depends upon the contactors being closed and the like, before incrementing the T1 pulse count reference above a predetermined initial value such as three. If the motor current is not greater than 50 amperes, at block 110 the T1 suppress flag is not set, so at block 112 the T1 pulse count is incremented. The T1 pulse count reference would still be at 3, and the program operation repeats another 20 Hz period for the reference 3 again because the motor current is not greater than 50 amperes. If the motor current is greater than 50 amps at block 126, at block 128 a check is made to see if the increment flag is set. This increment flag means that the T1 pulse count reference was incremented during the previous 20 Hz period and is provided to permit some delay to compensate for the response of the system. At this time, the increment flag is not set. At block 130 a check is made to see if the chopper duty cycle is greater than 10%. If it is, the increment flag is set at block 132, and the T1 pulse count reference is incremented by 2 at block 134. If the duty cycle at block 130 is less than 10%, a check is made at block 136 to see if it is greater than 5%. If it is greater than 5%, block 138 sets the increment flag and block 140 increments the T1 pulse count reference by 1. If the duty cycle at block 136 is less than 5%, the T1 pulse count reference is not incremented, and this means the whole second 20 Hz period is provided with 2 T1 ON pulses again. If the duty cycle is between 5 and 10%, then 3 pulses are allowed in that 20 Hz period, and if it is greater than 10%, 4 pulses are allowed out of 14.

When the incrementing of the reference count is done, the subroutine operation repeats for the next period of pulses, and allows 2, 3 or 4 ON pulses depending upon the T1 pulse count reference. When the pulse count is equal to the T1 pulse count reference at block 116, the T1 suppress flag is set at block 120 and the T1 pulses are then suppressed at block 122. The next time through the program the T1 suppress flag is set at block 110, so no more T1 pulses are allowed in that 20 Hz period. The T1 pulse count reference could be a minimum of 3 and a maximum of 14 at a 273 Hz pulse rate.

This program slowly builds up the motor current by allowing more and more T1 ON pulses until finally every T1 ON pulse is allowed, and then the duty cycle starts to widen out to increase the motor current in accordance with the requested motor current. If the chopper needed more current than is allowed by the T1 pulse count reference, the chopper would compensate by widening the duty cycle in an effort to provide the requested current. The program checks the duty cycle to see what the chopper is doing. When the duty cycle is greater than 5%, this indicates more motor current is requested, so the next time through the program the T1 pulse count reference is incremented, and the following time through the program, less duty cycle is needed to maintain the requested current so the duty cycle would drop off. This would cause the duty cycle to oscillate as more and more T1 pulse counts are provided. When the T1 pulse count reference reaches 15 to allow every one of the T1 ON pulses, and this routine cannot add any more motor current, then it is up to the chopper phase to increase the motor current. This program operates to maintain the duty cycle between 0 and 10% and tries to keep the duty cycle at a minimum while increasing the T1 ON pulse counts until finally the last pulse count is provided and there is no more that this routine can do, then the duty cycle of the chopper begins to increase above 10%.

Figure 10:
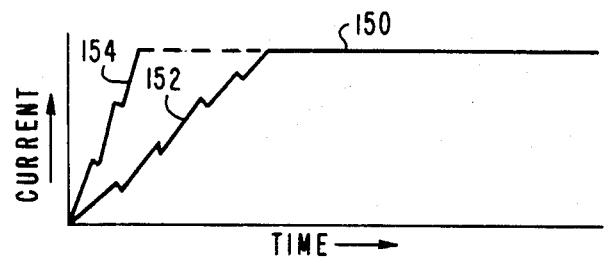
FIG. 10 shows the T1 ON-pulse output of a chopper apparatus controlled by a prior art pulse skipping operation.

As shown in FIG. 10, when the car starts to move, the current request is jerk limited for passenger comfort up to about 500 amperes or the requested motor current as shown by curve 150. With the prior art pulse skipping, on average it would follow curve 152 in a series of steps. Without pulse skipping, the curve 154 would indicate the motor current sharp climb in a series of steps up to the desired motor current.

Figure 11:
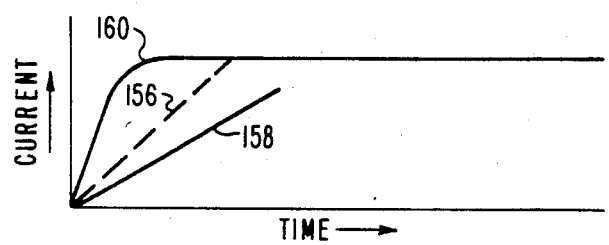
FIG. 11 shows the motor current increase provided by the present invention in relation to the requested motor current.

As shown in FIG. 11, with the ability to suppress ON pulses and if the current request is shown by curve 156, the number of initial counts such as 2 out of 14 provided in accordance with the present invention is determined to provide a motor current rise as shown by curve 158, and the current difference up to the curve 156 is provided with an increase in the duty cycle by the analog phase controller 64. The minimum duty cycle of about 10% without ON pulse skipping, would provide a current as shown by curve 160 and this is not desired.

Figure 12:
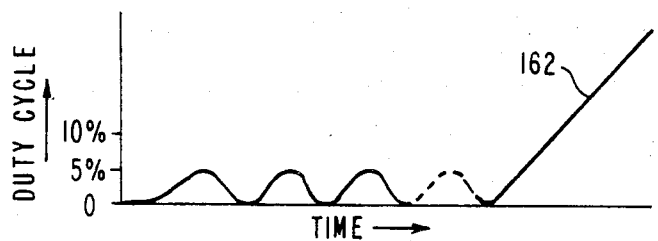
FIG. 12 shows the duty cycle operation of the chopper apparatus in accordance with the present invention.

In FIG. 12, curve 162 illustrates the duty cycle of the chopper which operates between 0 and 5% duty cycle, until the motor speed builds up to the point where the duty cycle increase is used to control the motor current.

Figure 13:
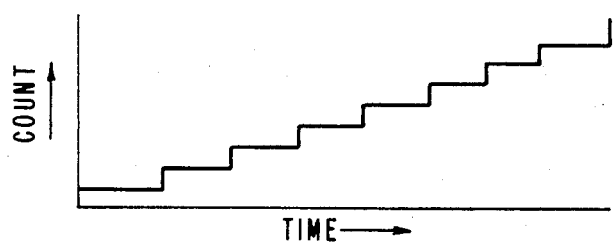
FIG. 13 shows the TI ON pulse count reference increase as more motor current is desired.

As shown in FIG. 13, the count reference can typically start off at a selected value, such as three counts. When more current is desired, the count reference is incremented to increase the motor current. When the phase angle goes above a predetermined limit of 5%, then the count reference is incremented by one and when the phase angle goes above 10%, then the count reference is incremented by two counts. This process repeats itself until the last count of 15 is reached, and then the increase in motor current is provided by variation of the phase angle. In addition, at a predetermined motor speed, such as 5 mph, the count skipping is bypassed.

The EMI signals produced by the chopper can be described as a series of sine waves at multiples of the chopper fundamental frequency. If the chopper frequency is 273 Hz, the following equation would describe the EMI signals produced.

$$A1 \sin(2 \text{ PI } 273T) + A2 \sin(2 \text{ PI } 546T) + A3 \sin(2 \text{ PI } 819T) + \ldots \quad (1)$$

Where A1, A2, A3, ... = Peak to Zero Amplitude of the Harmonic
PI = 3.1415927
T = Time
SIN = Sine Function The average voltage of the chopper output can be controlled through square wave modulation as well as pulse skipping. In relation to the EMI compatibility, the longer the ON and OFF periods persist in time the better. Using 5 ON cycles cycles followed by 5 OFF cycles to achieve reduced voltage can be described as a 27.3 Hz square wave modulation of the chopper cycles. Using 10 ON and 10 OFF is a 13.65 Hz modulation. The Fourier Series expansion of the modulation function which consists of one half cycle equal to one and one half cycle equal to zero is:

$$\tfrac{1}{2} + 2/\text{PI} \sin(2 \text{ PI } FM\, T) + 2/(3 \text{ PI}) \sin(2 \text{ PI } 3FM\, T) + 2/(5 \text{ PI}) \sin(2 \text{ PI } 5FM\, T) + \ldots \quad (2)$$

Where FM = The Modulation Frequency

The frequency spectrum produced with modulated chopper operation is seen by multiplying above equations 1 and 2 together and then using the following identity:

$$\sin A \sin B = (\cos(A-B) + \cos(A+B))/2 \quad (3)$$

The result is as follows looking at the first term in Eq. 1:

$A\tfrac{1}{2} \sin(2 \text{ PI } 273\, T)$ $+ A1/\text{PI} \cos(2 \text{ PI } (273+FM)T) A1/\text{PI} \cos(2 \text{ PI } (273-FM)T)$ $+ A\tfrac{1}{3}/\text{PI} \cos(2 \text{ PI } (273+3FM)T) + A\tfrac{1}{3}/\text{PI}$ $\cos(2 \text{ PI } (273-3FM)T)$ $+ A1/5/\text{PI} \cos(2 \text{ PI } (273+5\, FM)T) + A1/5/\text{PI} \cos(2 \text{ PI } (273-5FM)T) + \ldots$ The AM modulation produces sidebands around the normal harmonics at multiples of the modulation frequency. In the above example only odd multiple sidebands were produced because the modulation had a 50 percent duty cycle. Other duty cycles will produce harmonics at even side band multiples but their amplitude relative to the unmodulated harmonic will never exceed 1/N/PI where N is the sideband number. The amplitude of any given sideband does not change with the modulation frequency, but the frequency location of the sideband does change.

It has been determined by actual implementation of the square wave modulation of the chopper output ON pulses in accordance with the present invention for startup of an actual transit vehicle, that 20 Hz modulation will result in operation of the vehicle that is smooth. Experimentation with 16 Hz modulation was less desirable but was believed to be acceptable. Modulation at 12 Hz and below was believed to be unacceptable from a ride quality standpoint, although it would still meet a normal transit vehicle ride quality specification. Modulation at 20 Hz was chosen for implementation.

The resulting reduction in effective EMI signal interference levels achieved through the use of the present square wave modulation is as follows:

| Condition | Inband Interference Level Relative to Adjacent Harmonic | |
|---|---|---|
| With Pulse Skipping | −6.0 dB | |
| With 20 Hz Modulation (3rd Sideband) | −19.5 dB | |
| Improvement | 13.3 dB | 4.6 to 1 |

To produce approximately 20 Hz modulation of the chopper, that is actually 19.5 Hz modulation, the 273 Hz chopper control cycles were controlled in 14 cycle groups. In the first group, for the first 2 cycles, T1 ON pulses are fired and then for the remaining 12 cycles, the T1 ON pulses are suppressed. However, after the first group of pulses, some technique is needed to increase the average voltage as the motor increases RPM to the point that the present square wave modulation is no longer needed and the duty cycle controller 64 can take control with no TI ON pulses suppressed. The control scheme chosen uses the duty cycle as the motor current feedback indication during the modulation period. For a given number of T1 ON pulses per 14 cycle groups, the duty cycle of the firing cycles will increase as the motor increases RPM in order to increase the average applied voltage and maintain motor current. In order to smoothly transition out of the square wave modulation period and modulate for the shortest period of time, the duty cycle should be kept as low as possible. At the beginning of each 14 cycle group, the number of T1 ON pulses is increased by 1 if the duty cycle output of the analog controller 64 is above 5% and is increased by 2 if the duty cycle is above 10%. This keeps the duty cycle low to quickly pass through the modulation period and keep the motor ripple current low as desired.

What is claimed is:

1. In combination with a control apparatus for a transit vehicle operative with a direct current propulsion motor and movable along a conductive track, said control apparatus including a transit vehicle signaling system, a chopper for producing a string of voltage pulses having a substantially constant frequency to said motor, a chopper controller apparatus for controlling said string of output voltage pulses, the improvement which comprises:

said chopper controller apparatus comprising start-up chopper control means for operating said motor during start-up by square wave modulation of said string of voltage pulses produced by said chopper such that the extra harmonics produced by said start-up chopper control means are grouped to the frequency domain area immediately surrounding the harmonics produced by said voltage pulses of said chopper to produce a spectrum of side bands around each chopper harmonic such that the magnitude of the side bands drops off as a function of 1/n where n is the side band number, whereby electromagnetic interference which may be produced by said chopper with said transit vehicle signalling system is controlled.

2. In a control apparatus for a transit vehicle operative with a direct current propulsion motor and movable along a conductive track, said control apparatus including a transit vehicle signaling system, a chopper for producing a string of voltage pulses having a substantially constant frequency to said motor, a chopper controller apparatus for controlling said string of output voltage pulses, the method of starting said propulsion motor while controlling electromagnetic interference with said vehicle signaling system, said method comprising:

operating said motor during start-up by square wave modulation of said string of voltage pulses produced by said chopper such that the extra harmonics produced by said square wave modulation are grouped to the frequency domain area immediately surrounding the harmonics produced by said voltage pulses of said chopper to produce a spectrum of side bands around each chopper harmonic such that the magnitude of the side bands drops off as a function of 1/n where n is the side band number, whereby electromagnetic interference which may be produced by said chopper with said transit vehicle signalling system is controlled.

* * * * *